United States Patent
Liu et al.

[15] 3,678,024
[45] July 18, 1972

[54] CROSSLINKING OF ETHYLENE POLYMERS WITHOUT A CROSSLINKING AGENT

[72] Inventors: Gordon Y. T. Liu; Carl P. Strange, both of Baton Rouge, La.

[73] Assignee: The Dow Chemical Company, Midland, Mich.

[22] Filed: Jan. 5, 1970

[21] Appl. No.: 785

[52] U.S. Cl..................260/94.9 GA, 260/88.2 S, 260/93.7, 260/96
[51] Int. Cl......................C08f 3/02, C08f 3/04, C08f 27/00
[58] Field of Search..............................260/94.9 C–94.9 O, 260/6, 96 D, 93.7, 88.2 S

[56] References Cited

FOREIGN PATENTS OR APPLICATIONS 1,373,879    1964    France..................................260/94.9

OTHER PUBLICATIONS

" Chemical Degradation;" Encyclopedia of Polymer Science Technology, Vol. 4, 1966, page 676; Interscience, N.Y.

Primary Examiner—Joseph L. Schofer
Assistant Examiner—William F. Hamrock
Attorney—Griswold & Burdick, R. G. Waterman, L. J. Dankert and M. S. Jenkins

[57]    ABSTRACT

Ethylene polymers are crosslinked in the absence of crosslinking agents by working the normally solid olefin polymer, e.g., polyethylene, at temperatures just above the melting point of the polymer and at higher than normal shear rates, e.g., greater than 3,000 sec$^{-1}$.

8 Claims, No Drawings

CROSSLINKING OF ETHYLENE POLYMERS WITHOUT A CROSSLINKING AGENT

BACKGROUND OF THE INVENTION

This invention relates to crosslinking of normally solid, olefin polymers in the absence of crosslinking agents.

Olefin polymers, while very valuable, would be ideally suited for many more uses if it were not for a few limitations posed by their properties. Uncured olefin polymers, especially uncured polyethylene, become essentially liquid at elevated temperatures, dissolve or swell considerably in numerous organic liquids, become weak and brittle on loading beyond a few percent with most pigments, and usually undergo substantial environmental stress cracking. Crosslinking or curing substantially corrects each of these deficiencies of the olefin polymers, while the properties of the uncured olefin polymers such as toughness, flexibility, impact resistance and chemical resistance are unimpaired or even improved.

It is known to crosslink saturated olefin polymers in the presence of chemical crosslinking agents such as the peroxides, azo compounds, etc. or by high energy irradiation. A serious disadvantage attending the utilization of chemical crosslinking agents is the presence of the agent in the final product. In some instances the presence of such residues prevents approval by The Food and Drug Administration which is often required before the plastic can be employed in many human use applications. Although olefin polymers crosslinked by radiation do not suffer from the same disadvantage, the high initial cost of the necessary apparatus for production of the radiation places this process out of reach for many engaged in olefin polymer processing. In addition, both of the above conventional methods are somewhat hazardous in that chemical crosslinking agents are often explosive at temperatures near to those necessary to effect crosslinking and human exposure to radiation of any type is not desirable.

In view of the deficiencies in prior art methods for crosslinking olefin polymers, a particularly ethylene polymer, a method for crosslinking ethylene polymers with-out requiring chemical crosslinking agent or irradiation would be highly desirable.

SUMMARY OF THE INVENTION

Accordingly, the present invention is such a method for crosslinking olefin polymers, which method, as hereinafter described in detail, comprises working a normally solid olefin polymer at temperatures ranging from about 5° to about 45° C above the melting point of the polymer and at shear rates ranging from about 3,000 to about 50,000 sec$^{-1}$. It is believed that in working the polymer under these conditions the molecular chains are broken to form chain fragments generally having free radicals on one or both ends of each fragment. The resulting chain fragments interact with one another to form molecules having a significant number of crosslinkages between the chains.

The resulting crosslinked olefin polymers of this invention have low melt flow viscosities, high tensile strengths and are generally insoluble in organic solvents. Articles molded from these crosslinked polymers exhibit increased resistance to high temperatures and to abrasive forces. These crosslinked olefin polymers are useful in the manufacture of wire cable jacketing, molded articles, heat resistant coatings for furniture and the like.

DESCRIPTION OF THE PREFERRED EMBODIMENTS

Olefin polymers suitably employed in the practice of this invention are normally solid, saturated homopolymers and copolymers of mono-α-olefins having from two to eight carbon atoms. For the purposes of this invention, saturated polymers are defined as those which contain substantially no aliphatic unsaturation, e.g., alkenyl or alkynyl bonds. Suitable saturated olefin polymers when subjected to mild heating and high shear undergo a substantial number of scissions at C—C bonds in the polymer chains, thereby resulting in the formation of free radicals.

Examples of suitable olefin polymers include the various types of polyethylene, e.g., linear polyethylene and highly branched polyethylene; polypropylene, ethylene/butene-1 copolymers, ethylene/propylene copolymers and the like. Also suitable are blends of the above olefin polymers such as blends of polyethylene and polypropylene and blends of ethylene/butene-1 copolymer and polypropylene. Preferred olefin polymers are linear polyethylene and linear ethylene/butene-1 copolymers containing more than 80 weight percent of polymerized ethylene.

Olefin polymers suitable for the purposes of this invention are readily prepared by methods described in Sittig, Polyolefin Processes, Chemical Process Review, National Development Corp., No. 2 (1967).

Small amounts, i.e., up to about 6 weight percent based on the total olefin polymer composition, of fillers and other ingredients such as a variety of carbon blacks, clays, silicas, whitings and antioxidants which are often desirable are also optionally employed in the compositions of this invention. Such ingredients can be introduced during working of the olefin polymer under the prescribed conditions of temperature and shear.

In practicing this invention the saturated olefin polymer is fed into a suitable polymer working apparatus and worked at temperatures ranging from about 5° to about 45° C above the melting point of the polymer, preferably from 25° to 40° C, and at shear rates ranging from 3,000 to about 50,000 sec$^{-1}$, preferably from 3,000 to 22,000 sec$^{-1}$. In a particularly preferred embodiment, wherein the olefin polymer is an ethylene homopolymer or an ethylene/butene copolymer having a melting point from 130°–140° C, the working operation is carried out at from 150° to 185° C. For the purposes of this invention by the term "working" is meant any operation of masticating the polymer such as extruding, mixing, milling, grinding, and kneading. Preferably the working operation is carried out by extrusion of the polymer from a screw-type extruder. Other suitable apparatus for accomplishing the working operation are Banbury mixer, hot roll mill and the like.

The most critical aspects of the working operation are the temperatures and shear rates employed. If, for example, the working operation is attempted by extruding the olefin polymer under conventional conditions of temperature, e.g., 195°–210° C for polyolefins having melting points of 130°–140° C, and shear, e.g., 1,500 to 2,500 sec$^{-1}$; the extruded polymer is slightly degraded rather than crosslinked. If higher than normal shear rates are employed at normal extrusion temperatures, the extruded polymer is significantly degraded as evidenced by marked increase in melt index. At temperatures less than 5° C above the melting point of the polymer, working of the polymer is difficult, if not impossible. At shear rates outside the range of 3,000 to 50,000 sec$^{-1}$, degradation generally predominates.

Generally the olefin polymer must be worked under the specified conditions for at least 10 seconds before any appreciable crosslinking is observed; preferably the period for working the polymer is from 20 to about 150 seconds.

When optional additives are employed, such additives are preferably added to the polymer prior to working by dry blending the polymer in powdered form with the additive or by feeding the additive into the softened mass of polymer during working.

Following the working operation, the crosslinked olefin polymers are readily formed into shaped articles having improved heat and abrasion resistance by any conventional means, for example, extrusion, compression and injection molding, rotational molding and the like.

The following examples are given for the purposes of illustrating the invention and should not be construed as limiting its scope. In the following examples, all parts and percentages are by weight unless otherwise indicated. Melt indexes are determined according to ASTM D-12 1238-65T(E).

Example 1

A sample of pre-extruded ethylene/butene-1 copolymer (99.5/0.5) having a melt index of 0.38 decig/min and a density of 0.952 is extruded in a Werner and Pfleiderer ZSK-53 Kneader-Compounder at a temperature of about 160° C and a shear rate of 3450 sec⁻¹. Shear rate is calculated according to the formula $$y = \frac{\pi Dc(N/60)}{\frac{1}{2}(D_b - D_c)}$$

wherein $D_b$ = barrel diameter (2.100 in.), $D_c$ = screw diameter at crest (2.081 in.), and $N$ = extruder speed (300 rpm). The residence time of the polymer in the extrusion zone is about 60 sec and feed rate of polymer into the extruder is about 100 lbs/hr. The properties of the resulting crosslinked polymer are recorded in table I.

Other samples of different ethylene polymers and a blend of ethylene polymer and polypropylene are also processed according to the above procedure. The results are also shown in table I.

For the purposes of comparison and to particularly point out the critical limitations of the present invention, a sample of pre-extruded ethylene/butene-1 copolymer is extruded according to example 1 except that a temperature of 200° C and a shear rate of 2,000 sec⁻¹ are employed. A second and third sample of the same copolymer are similarly extruded at a temperature of 180° C and a shear rate of about 2000 sec⁻¹, and a temperature of 200° C and shear rate of 3450 sec⁻¹, respectively. The properties of these comparative samples ($Y_1$, $Y_2$, and $Y_3$) are measured and recorded in table I.

TABLE I

| Sample Number | Polymer [1] | Extrusion temp., °C. | Extrusion shear rate, sec⁻¹ | Original melt index, decig./min. | Final melt index, decig./min. | Original melt tension, g.[2] | Final melt tension, g.[2] |
|---|---|---|---|---|---|---|---|
| 1 | E/B₁ | 160 | 3,450 | 0.38 | 0.2 | 6.9 | 12.0 |
| 2 | E/B₂ | 160 | 3,450 | 0.45 | 0.22 | 8.3 | 11.0 |
| 3 | E/B₃ | 160 | 3,450 | 0.21 | 0.09 | 7.8 | 12.0 |
| 4 | E/B₄+5%P/Pr | 160 | 3,450 | 0.40 | 0.20 | 7.0 | 12.0 |
| 5 | P/E₁ | 160 | 3,450 | 0.85 | 0.55 | 5.0 | 8.6 |
| 6 | P/E₂ | 160 | 3,450 | 0.70 | 0.44 | 6.2 | 9.5 |
| Y₁* | E/B₁ | 200 | 2,000 | 0.38 | 0.40 | 6.9 | 6.5 |
| Y₂* | E/B₁ | 180 | 2,000 | 0.38 | 0.40 | 6.9 | 6.5 |
| Y₃* | E/B₁ | 200 | 3,450 | 0.38 | 0.40 | 6.9 | 6.5 |

[1] E/B₁=ethylene/butene-1 copolymer (99.4/0.6), melting point=133° C., density=0.959; E/B₂=ethylene/butene-1 copolymer (99.0/1.0), melting point=133° C., density=0.955; E/B₃=ethylene/butene-1 copolymer (96.2/1.8), melting point=133° C., density=0.953; E/B₄=ethylene/butene-1 copolymer (99.4/0.6), melting point=133° C., density=0.959, P/Pr=polypropylene, melting point=160° C., density=0.951; P/E₁=polyethylene, melting point=134° C., density=0.9590; P/E₂=polyethylene, melting point=134° C., density=0.960.

[2] Measured as the number of grams of tension required to draw a strand of polymer at 190° C. from an extrusion die through a circular orifice having a diameter of 0.0825 inch at a draw rate of 7.9 feet/minute.

The melt tension measuring apparatus consists of—
 (a) a melt indexer as described in ASTM D-1238-65T,
 (b) a 10 kilogram weight bearing on the piston of said melt indexer,
 (c) a fiber glass cylinder (3″ diameter x 3″ length) mounted on the indexer and circumscribing the die,
 (d) a take-up roll for winding up and drawing the strand as the strand leaves the die, and
 (e) a strain guage capable of measuring the strain in grams on the strand as the strand is drawn from the die at the specified rate of 7.9 feet/minute.

*Not an example of the invention.

A decrease in melt index coupled with a corresponding increase in melt tension is an accurate indicator that crosslinking of the polymer has occurred. As evidenced by the results of table I, sample nos. 1–6 which are processed within ranges of temperature and shear specified hereinbefore show markedly increased crosslinking whereas comparative sample nos. $Y_1$, $Y_2$ and $Y_3$ which are processed under conditions of temperature and/or shear outside the specified ranges are not appreciably crosslinked.

What is claimed is:

1. A method for crosslinking olefin polymers comprising working a normally solid, saturated homopolymer or copolymer of mono-α-olefin having from two to eight carbon atoms at temperatures ranging from about 5° to about 45°C above the melting point of the polymer and shear rates ranging from about 3,000 to about 50,000 sec⁻¹ for at least 10 seconds up to about 150 seconds, whereby the melt index of the polymer is decreased and the melt tension of the polymer is increased.

2. The method according to claim 1 wherein the polymer is worked in a screw type extruder.

3. The method according to claim 1 wherein the temperature is 25° to 40°C above the melting point of the polymer and the shear rate is from 3,000 to 20,000 sec⁻¹.

4. The method according to claim 3 wherein the polymer is worked for a period from 30 to 150 seconds.

5. The method according to claim 1 wherein the polymer is polyethylene.

6. A method according to claim 1 comprising working a normally solid linear ethylene polymer at temperatures ranging from about 5° to about 45°C above the melting point of the polymer and shear rates ranging from about 3,000 to about 20,000 sec⁻¹ for a period of from about 30 to about 150 seconds.

7. The method of claim 6 wherein the ethylene polymer is a preextruded bulk polymer.

8. The method of claim 7 wherein the shear rate is about 3450 sec⁻¹.

* * * * *